(12) United States Patent
Aleksoff

(10) Patent No.: US 6,744,950 B2
(45) Date of Patent: Jun. 1, 2004

(54) CORRELATORS AND CROSS-CORRELATORS USING TAPPED OPTICAL FIBERS

(75) Inventor: Carl Aleksoff, Dexter, MI (US)

(73) Assignee: Veridian Systems, Ann Arbor, MI (US)

(*) Notice: Subject to any disclaimer, the term of this patent is extended or adjusted under 35 U.S.C. 154(b) by 0 days.

(21) Appl. No.: 10/647,400

(22) Filed: Aug. 25, 2003

(65) Prior Publication Data
US 2004/0042727 A1 Mar. 4, 2004

Related U.S. Application Data

(63) Continuation-in-part of application No. 09/765,215, filed on Jan. 18, 2001, now Pat. No. 6,611,645.

(51) Int. Cl.[7] .................................................. G02B 6/26
(52) U.S. Cl. .................................... 385/48; 385/10
(58) Field of Search ........................... 385/1–4, 8–10, 385/12–15, 40, 48, 33, 37, 39, 123, 130, 131, 901

(56) References Cited

U.S. PATENT DOCUMENTS

| | | | |
|---|---|---|---|
| 5,061,032 A | 10/1991 | Meltz et al. | 385/37 |
| 5,351,321 A | 9/1994 | Snitzer et al. | 385/10 |
| 5,832,156 A | 11/1998 | Strasser et al. | 385/48 |
| 5,850,302 A | 12/1998 | Strasser et al. | 385/127 |
| 6,137,612 A | 10/2000 | Startup | 359/172 |
| 6,611,645 B2 * | 8/2003 | Aleksoff | 385/48 |

* cited by examiner

Primary Examiner—Khiem Nguyen
(74) Attorney, Agent, or Firm—Gifford, Krass, Groh, Sprinkle, Anderson & Citkowski, PC

(57) ABSTRACT

A Tapped Optical-Fibers Processor (TOP) for correlation and autocorrelation facilitates the processing if radar and SAR (synthetic aperture radar) signals, allowing fine resolution to be obtained without fast front-end sampling while significantly reducing digital computational burdens. Particularly in conjunction with radar signal processing, the input signal may be composed of the sum of at least two or more signals, in which case the output may include the autocorrelations of both inputs as well as the generation of a cross-correlation of the two autocorrelations. In terms of hardware, a signal processor according to the invention preferably includes a coherent laser source operating at a carrier frequency; a modulator to insert an input RF signal into the carrier; an optical fiber radiator composed of a fiber with taps that radiate the modulated optical signal; a lens to perform a spatial Fourier transformation on the radiated signal; and a detector array to output the transformed signal to a digital processor for additional signal processing. In any case, the two input signals may be electronically or optically combined.

20 Claims, 4 Drawing Sheets ated at a carrier frequency; a modulator to insert an input RF signal into the carrier; an optical fiber radiator composed of a fiber with taps that radiate the modulated optical signal; a lens to perform a spatial Fourier transformation on the radiated signal; and a detector array to output the transformed signal to a digital processor for additional signal processing. In any case, the two input signals may be electronically or optically combined.

CORRELATORS AND CROSS-CORRELATORS USING TAPPED OPTICAL FIBERS

REFERENCE TO RELATED APPLICATION

This application is a continuation-in-part of U.S. patent application Ser. No. 09/765,215, filed Jan. 18, 2001, now U.S. Pat. No. 6,611,645, the entire content of which is incorporated herein by reference.

FIELD OF THE INVENTION

This invention relates generally to signal processing and, in particular, to signal correlation and cross-correlation using tapped optical fibers.

BACKGROUND OF THE INVENTION

As fiber optic technology continues to grow, the use of various diffraction gratings within the fibers for signal processing will become increasingly common. Our co-pending U.S. patent application Ser. No. 09/765,215, incorporated herein by reference, describes a two-dimensional, fiber-delay radiator (FDR). The device is made with optical-fiber taps forming Bragg gratings orientated at 45 degrees to the fiber core, permitting light to emerge directly out of the side of the fiber, linearly polarized. The optical fiber is wound on a cylindrical-like form such that a number of loops of the fiber are available for making a number of taps on each loop. Taps are preferably generated along each loop of the fiber so that a portion of the light propagating in the fiber will exit sideways from fiber at the taps. A lens system is then used to capture the light from the taps and produce a Fourier Transform of the total distribution of light from all the taps. A video camera then captures this Fourier Transform light and the video signal is acquired for further computer processing. The result is that the power spectrum of the light signal is displayed on a monitor.

The preferred construction of the FDR would include taps with "ideal" phase characteristics. It may be possible to directly fabricate such a device. However, a method to correct the phases in real-time and to introduce desired weighting may be preferable. To achieve this goal, a phase spatial light modulator may be used to correct and modify the tap phases. Another embodiment uses a coherent reference wave to generate a holographic optical element (or complex spatial light modulator) to correct the tap phases and amplitudes. According to this technique, a coherent reference source and a detector array are used to capture the radiation amplitude pattern of the FDR. Then, with digital processing of the captured pattern, the desired spectral signal properties are obtained.

This basic configuration finds application in a wide variety of commercial, industrial and military situations including, but not limited to the analysis of signals that have been modulated on light propagating in a fiber; the analysis of telecommunication channels in optical fiber network links; the analysis of optical sources by determining their spectral characteristics; and as part of a spectrometer to analyze gases and other materials. The spatial modulator version, in particular, could be used as a phased array for Ladar and Lidar applications; as a beam director for data storage and other scanning applications; and as a channelizer for use in separating out and monitoring individual signal channels.

SUMMARY OF THE INVENTION

This invention extends the principles disclosed in U.S. patent application Ser. No. 09/765,215, with emphasis on the use of a Tapped Optical-Fibers Processor (TOP) for correlating wide bandwidth and large time-bandwidth signals. In particular, it can be applied to processing radar and SAR (synthetic aperture radar) signals. The TOP can also be used for lidar and ladar systems with out the need for modulators or separate carrier light source. Broadly, using this approach, fine resolution can be obtained without fast front-end sampling and digital computational burdens can be significantly reduced.

A preferred method of signal processing according to the invention includes the steps of providing an optical carrier signal; modulating the optical carrier signal with an input signal to provide an optically modulated signal; radiating the optically modulated signal from a set of taps formed in an optical fiber; performing a spatial Fourier transformation on the radiated signal; detecting the Fourier transformed signal and converting the detected signal into an electrical signal; and performing a digital Fourier transformation as well as other processing functions on the electrical signal to output an autocorrelation of the input signal.

The radiated signal is a function of the distance between the taps, the velocity of the signal through the fiber, and an aperture weighting function. The resulting the autocorrelation of the input signal is weighted by the autocorrelation of the aperture weighting function.

Particularly in conjunction with radar signal processing, the input signal may be composed of the sum of at least two or more signals, in which case the output may include the autocorrelations of both inputs as well as the generation of cross-correlation of the two signals.

In terms of hardware, a signal processor according to the invention preferably includes a coherent laser source operating at a carrier frequency; a modulator to insert an input RF signal into the carrier; an optical fiber radiator composed of a fiber with taps that radiate the modulated optical signal; a lens to perform a spatial Fourier transformation on the radiated signal; and a detector array to output the transformed signal to a digital processor for additional signal processing. In any case, the two input signals may be electronically or optically combined.

In the case of ladar and lidar applications, the received light along with the source light could be used as input to the invention without the need for modulators or a separate carrier light source.

DETAILED DESCRIPTION OF THE INVENTION

Figure 1:
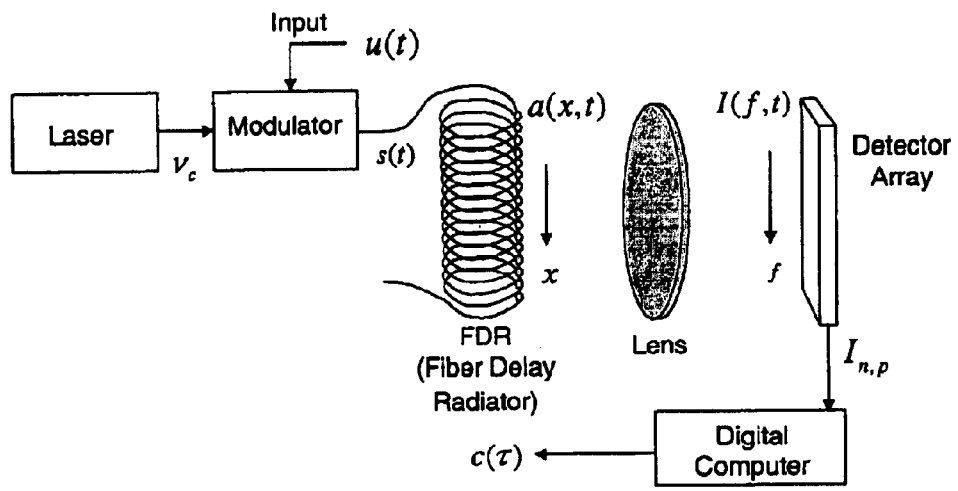
FIG. 1 illustrates a Tapped Optical-Fibers Processor (TOP) system applicable to the present invention.

The basic TOP system concept is illustrated in FIG. 1. It consists of a coherent laser source operating at the optical carrier frequency $v_c$, a modulator to insert RF signals onto the optical carrier, an Optical Fiber Radiator (OFR) composed of a fiber with taps that radiate the optical signal, a lens to take the spatial Fourier Transform of the radiated signal, and a detector array that read out the transformed signal to a digital processor for final processing.

First consider a RF signal u(t) which is inserted onto the optical carrier signal to give the modulated optical signal $$s(t) = u(t)e^{-2\pi i v_c t} \quad (1)$$

This signal is radiated from the taps in the FDR as it propagates along the fiber. The radiated light is given by $$a(x, t) = s\left(t - \frac{x}{V}\right) \cdot w(x) \quad (2)$$

where x is distance along the FDR taps, V is the effective velocity of the signal along the taps, and w(x) is the aperture weighting function. This radiated signal is then spatial Fourier Transformed by the lens to give the following optical amplitude signal at the detector array $$A(f, t) = S(f)e^{-2\pi i t f} * W(f) \quad (3)$$
$$= U(f)e^{-2\pi i t f} * W(f) * \delta(f - v_c)$$

where f is a normalized distance with units of frequency, * represents the convolution operation and upper case letter represent the forward FT function of functions represented by corresponding lower case letters. (Note:

$$f = \frac{-Vz}{\lambda_c L},$$

where L is the focal length of the lens, $\lambda_c$ is the operational optical wavelength, and z is the physical coordinate with the same positive sense as for x.)

The TOP is set to operate with the optical carrier at the origin where f=0. The instantaneous intensity that is seen by the detector array is thus given by $$I(f, t) = |A(f - v_c, t)|^2 \quad (4)$$
$$= |U(f)e^{-2\pi i t f} * W(f)|^2$$

The detector array then integrates the intensity to generate the acquired signal $$I_{n,q} = \eta_d \int_{t_n - T_d/2}^{t_n + T_d/2} dt \int_{f_q - F/2}^{f_q + F/2} df I(f, t) \quad q = 1, \ldots, Q \quad (5)$$

where $I_{n,q}$ is the signal for qth detector at acquisition time $t_n$, $T_d$ is the time integration, F the spatial integration, and $\eta_d$ the conversion efficiency.

We assume that the acquisition sampling in space is adequate to represent the intensity function as a continuous function. This allows us to use Fourier Transforms rather than discrete digital Fourier Transforms in the following analysis. Thus, the detected signal can be written as $$I_n(f) = \eta_d \int_{-\infty}^{\infty} rect\left(\frac{t - t_n}{T_d}\right) I(f, t) dt \quad (6)$$

and its FT as $$i_n(\tau) = \eta_d \int_{-\infty}^{\infty} rect\left(\frac{t - t_n}{T_d}\right) i(\tau, t) dt \quad (7)$$

where the FT of the intensity signal I(f,t) is $$i(\tau, t) = [u(\tau - t)w(\tau)]^* \underset{\tau}{\otimes} [u(\tau - t)w(\tau)]. \quad (8)$$

Here, $$\underset{\tau}{\otimes}$$

represents the correlation operation in delay space as defined by $$g_1^*(\tau) \underset{\tau}{\otimes} g_2(\tau) \equiv \int_{-\infty}^{\infty} g_1^*(\tau') g_2(\tau' + \tau) d\tau' \quad (9)$$

Thus, in general, the correlation is between weighted traveling waves of the input signal.

Now consider the detected signal captured by the array by substituting Eq. (4) into Eq. (6), which gives $$I_n(f) = \eta_d \int df' \int df'' U^*(f') U(f'') W^*(f - f') \quad (10)$$
$$W(f - f'') \int_{-\infty}^{\infty} dt \cdot rect\left(\frac{t - t_n}{T_d}\right) e^{-2\pi i t (f'' - f')}$$

Carrying out the time integration gives $$I_n(f) = \eta_d T_d \int df' \int df'' U^*(f') U(f'') W^*(f-f') W(f-f'') sinc[T_d(f''-f')] e^{-2\pi i (f''-f') t_n} \quad (11)$$

We now note that if our integration is long with respect to any delays of interest, the normalized sinc function can be replaced by a delta function and we can let f'=f" to obtain $$I_n(f) = \eta_d \int df' |U(f')|^2 |W(f - f')|^2 \quad (12)$$
$$= \eta_d |U(f)|^2 * |W(f)|^2$$

We now take the FT with respect to f to obtain $$i_n(\tau) = \eta_d [u^*(\tau) \underset{\otimes}{} u(\tau)] \cdot [w^*(\tau) \underset{\otimes}{} w(\tau)] \quad (13)$$

This is our basic result, namely, that the FT of the detected signal gives the gives the autocorrelation of the input signal weighted by the autocorrelation of the window function.

If the aperture function is a uniform weight given by $$w(\tau) = rect\left(\frac{\tau}{T_a}\right), \quad (14)$$

where $T_a$ is the transit aperture time, then $$w^*(\tau) \otimes w(\tau) = \Lambda\left(\frac{\tau}{T_a}\right) \qquad (15)$$

where the triangle function is defined by $$\Lambda(\tau) = \begin{bmatrix} 1 - |\tau| & \text{if } |\tau| < 1 \\ 0 & \text{if } |\tau| > 1 \end{bmatrix} \qquad (16)$$

We note that $T_a = X_a/V$, where $X_a$ is the aperture length of the FDR. It is clear, physically and mathematically, for a continuous signal that as the delay $\tau$ increases the common overlap in signal decreases and no correlation is obtained for $|\tau| > T_a$.

Cross-Correlation Operation

Of particular interest is when the input RF signal is composed of the sum of two signals. For this case of interest the input signal is given by $$u(t) = u_a(t - \tau_a) + u_b(t - \tau_b) \qquad (17)$$

Figure 3:
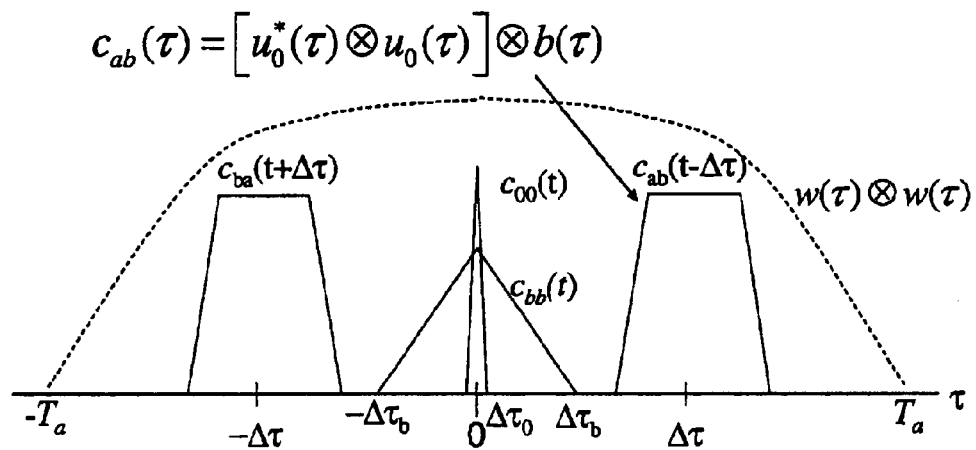
FIG. 3 shows the correlation outputs for dual signal inputs with delay offsets.
Figure 2:
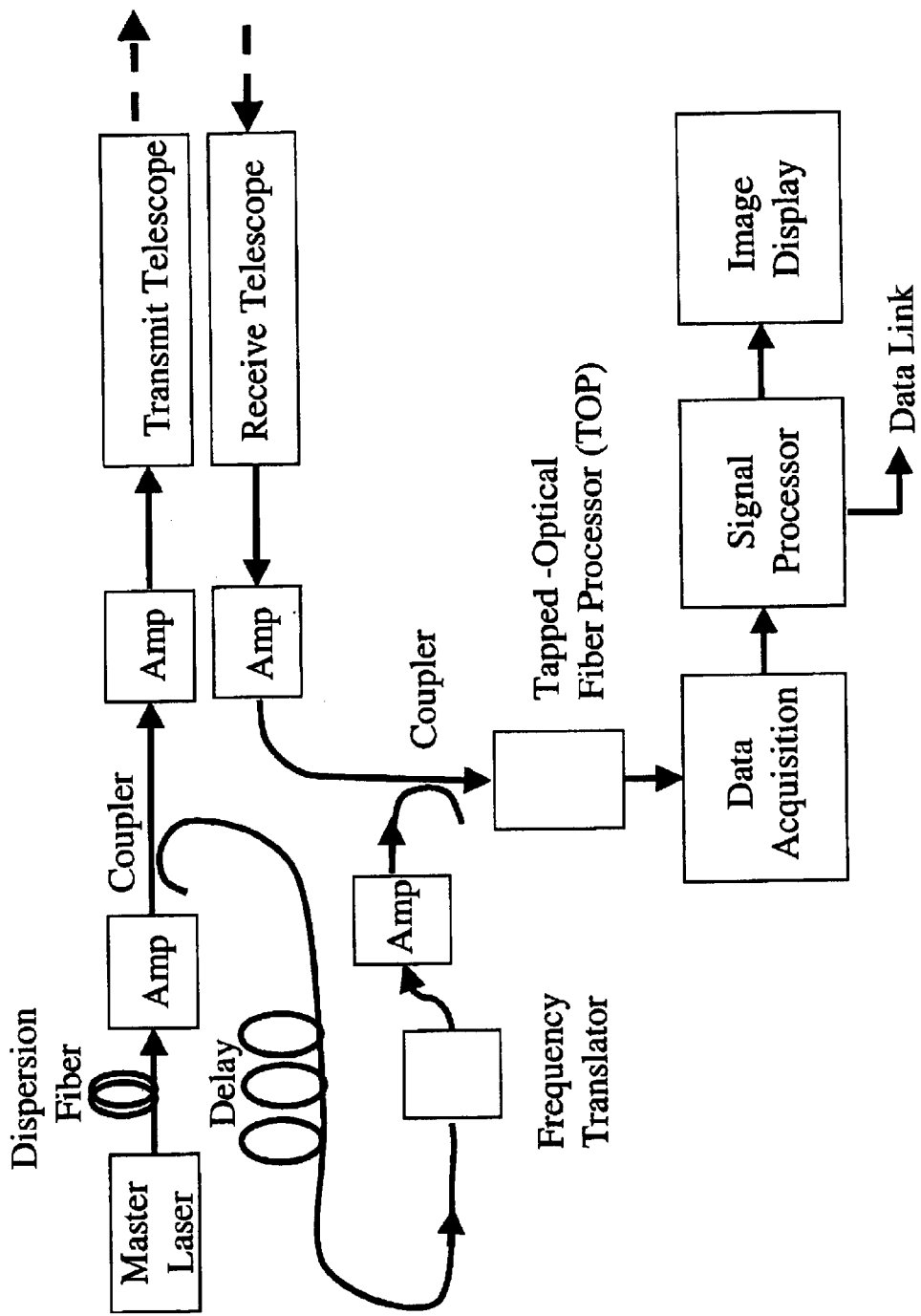
FIG. 2 shows how the tapped Optical-Fiber Processor (TOP) can be used in a ladar or lidar system.

Then, the signal correlation from Eq. (13) is given by $$u^*(\tau) \otimes u(\tau) \equiv c(\tau) \qquad (18)$$
$$= c_{aa}(\tau) + c_{bb}(\tau) + c_{ab}(\tau - \Delta\tau) + c_{ba}(\tau + \Delta\tau)$$

where the correlation functions are defined by $$c_{mn}(\tau) = u_m^*(\tau) \otimes u_n(\tau) \quad m, n = a, b \qquad (19)$$

and $\Delta\tau = \tau_b - \tau_a$. Thus, as indicated in FIG. 3, the cross-correlations are offset by their delay differences from the centered auto-correlations.

We now assume, as is typical for radar or ladar or lidar signals, that if $u_a(t) = u_0(t)$ is the transmitted signal then the received signal can be represented by $$u_b(t) = u_0(t) \sum_{m=1}^{M} b_m \delta(t - \tau_m) \qquad (20)$$

where $b_m$ is the radar amplitude from a point scatter with relative time delay $\tau_m$, and M is the number of scatterers. Or we can describe the return in terms of the scattering distribution b(t) as $$u_b(t) = u_0(t) \otimes b(t) \qquad (21)$$

Thus, we can write $$c(\tau) = c_{aa}(\tau) + c_{bb}(\tau) + c_{ab}(\tau - \Delta\tau) + c_{ba}(\tau + \Delta\tau) \qquad (22)$$

where for point scattering description $$c_{aa}(\tau) = c_{00}(\tau) = u_0^*(\tau) \otimes u_0(\tau) \qquad (22)$$

$$c_{bb}(\tau) = \sum_{m}^{M} \sum_{n}^{M} b_m^* b_n \delta(\tau - \tau_m + \tau_n) \qquad (23)$$

$$c_{ab}(\tau) = c_{00}(\tau) \sum_{m=1}^{M} b_m \delta(t - \tau_m) \qquad (24)$$

-continued $$c_{ba}(\tau) = c_{00}(\tau) \sum_{m=1}^{M} b_m^* \delta(\tau + \tau_m) \qquad (25)$$

or for a scattering function description $$c_{bb}(\tau) = [u_0(\tau) \otimes b(\tau)]^* \otimes [u_0(\tau) \otimes b(\tau)] \qquad (26)$$

$$c_{ab}(\tau) = c_{00}(\tau) \otimes b(\tau) \qquad (27)$$

$$c_{ba}(\tau) = c_{00}^*(\tau) \otimes b(\tau) \qquad (28)$$

It is seen that the scattering object is range imaged in the cross-correlation terms with the autocorrelation term $c_{00}(\tau)$ as the point spread function. See FIG. 3. If the signal has a bandwidth of B, then the delay resolution is $$\tau_{res} = \frac{1}{B} \qquad (29)$$

If $\Delta\tau_{range}$ is the maximum spread of delays in the range signal $u_b(t)$, then we see that the following condition needs to be satisfied for the image to be captured without exceeding the aperture window or overlapping the autocorrelation terms.

$$\frac{3\Delta\tau_{range}}{2} < \Delta\tau < T_a - \frac{\Delta\tau_{range}}{2} \qquad (30)$$

The maximum delay spread is given by $$\text{Max}\Delta\tau_{range} = \frac{T_a}{2} \qquad (31)$$

when $\Delta\tau = 3T_a/2$.

Configurations

Figure 4:
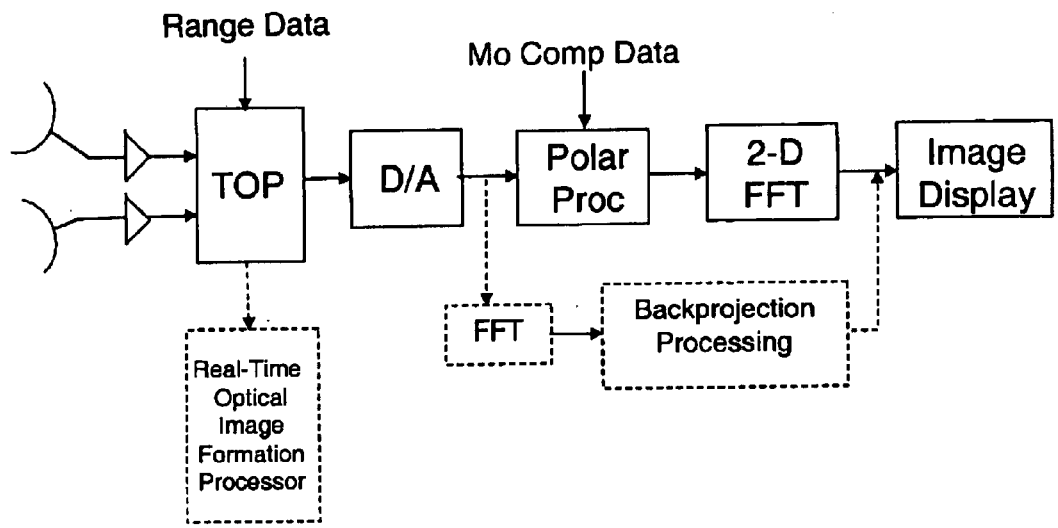
FIG. 4 depicts front-end usage of the TOP as part of a synthetic aperture radar system using a spotlight processing algorithm along with alternative processing techniques.
Figure 5:
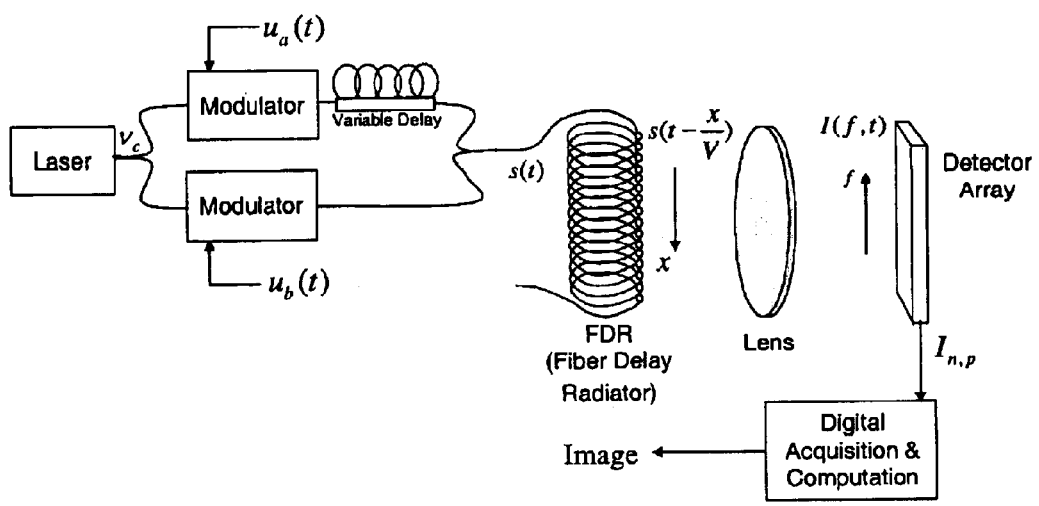
FIG. 5 shows a TOP configuration with dual modulators and variable fiber delay.

The TOP system would be used as indicated in FIG. 4. It would be part of the front end of a radar receiver that uses two antennas. The output of the TOP would then be further digitally processed. The signals from the antennas could be combined electronically to generate the input into TOP system, as shown in FIG. 1. Alternatively, the separate signals could be combined optically as indicated in FIG. 5. Here, a fiber coupler is used to separate the input light into two beams that are individually modulated. Then one of the modulated outputs is delayed appropriately via a variable fiber delay line to bring the two signals within the delay aperture of the processor and with delay differences to optimize the processing aperture. The fiber delay line could be a combination of discrete long delays (microseconds) for any fixed offsets and fine control to change the delay as a function of time, as is useful for synthetic aperture imaging. The two modulated signal are then recombined via a fiber coupler to feed the FDR. For spotlight processing the signal from the TOP could be used directly, after digitization, as phase history input. For back-projection processing, the digitized signal would be fast Fourier transformed first to bring it into the correlation (projection) domain, before further processing. Direct optical processing is also possible.

It is seen that IF frequency mixing and fast digitization of the input signal is avoided by applying direct RF modulation of the light, which then produces a slowly changing interference pattern. Pre-summing of the signal is accomplished via the detector integration of the interference pattern. The interference pattern can be digitized at moderate rates. In other words, the TOP system has analog processed the signals, considerably reducing the required (subsequent post-optical) sampling rates.

Potential Performance and Available Hardware

Depending on physical size limitations, a range of processor parameters are available. Consider the following system that probably is near the limits of current technology. The primary fixed parameter is the velocity of light (fundamental mode) in a fiber, which is about $2\times10^8$ m/sec, or about 5 nsec delay per meter of fiber. If we use a 125 $\mu$m diameter fiber, we can get about 7 loops per mm of FDR height, and with a 20 cm high FDR, we get about 1400 loops per FDR. If we set the loop length to 10 cm, we get a sample rate of 0.5 nsec, which gives a device bandwidth of 1 GHz. Modulators are available with over 40 GHz of bandwidth, and hence are not the limiting factor. The total fiber length is 140 m, which gives an aperture time of 700 nsec. Since the FDR could be less than 2 cm wide, we could stack 10 of them in a 20 cm wide package to get a total aperture time of 7 $\mu$sec.

The resolution of the system is given by the autocorrelation of the signal. For a 1 GHz bandwidth signal, the delay resolution would be 1 nsec, which corresponds to half foot resolution for a monostatic system.

The detector array pitch must be sufficient to sample the highest fringe frequency at greater than twice per cycle. The total number of detectors must be equal to twice the desired number of scene resolution elements. Of course, some overhead in sampling and number of elements is desirable. We typically run the detector operation near saturation to optimize the signal-to-noise ratio and minimize the temporal sampling rate. This is done by controlling the integration time and light level. The detector array frame rate is independent of the input bandwidth. However, for synthetic aperture radar (SAR) operation the detector integration time is determined by the azimuth sampling requirements, which tend to be a few thousand hertz. Hence, we might nominally require a 10 KHz frame time for the detectors, which we note is easily accomplished for linear arrays. Linear detector arrays are available with 44 KHz frame times for 4096 element arrays and correspondingly faster frame rates for fewer elements. In this case, the overall light level will be increased to operate near saturation.

We have demonstrated basic spectral analyzer operation down to 10 MHz resolution and up to 100 GHz bandwidth operation at a wavelength 840 nm. Modulated spectral analysis up to 10 GHz was demonstrated. This spectral analysis work has used holographic techniques to generate digital matched filter correction of the taps. Hence, the no attempt was made to generate diffraction limited optical quality of the tap array, as would be desirable for this radar correlator operation. We expect that such digital filtering or an electronically controlled spatial light modulator (e.g., a liquid crystal spatial light modulator) will be incorporated as part of the FDR to give the desired tap phase correction and allow for adaptive adjustments in the analog optical processing.

Figure 6:
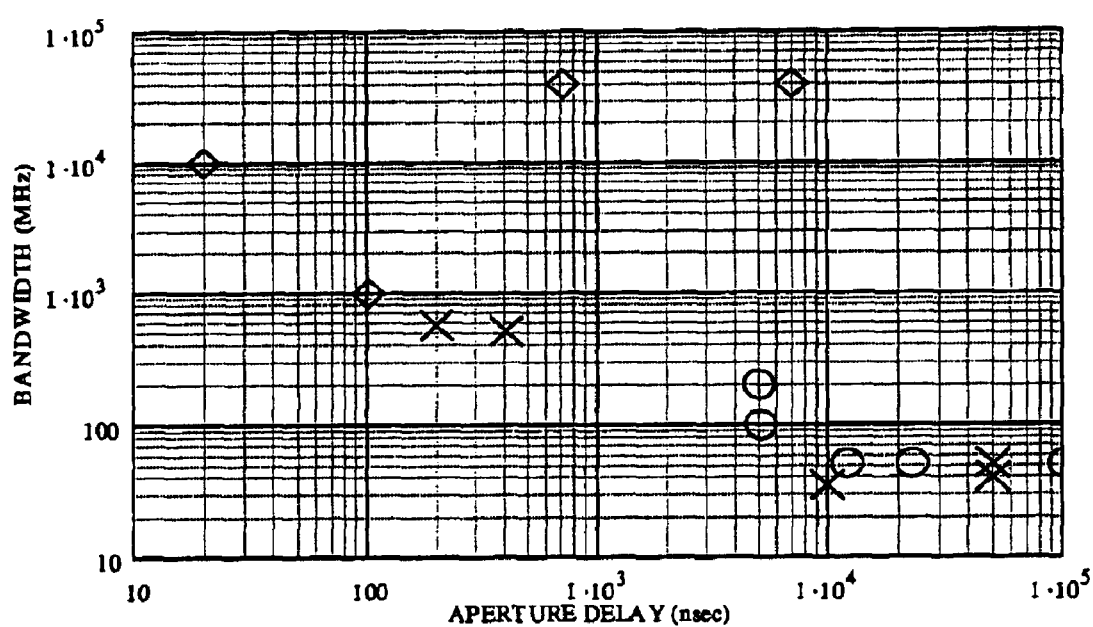
FIG. 6 presents a bandwidth versus aperture delay comparison between commercially available AO cells (Xs and Os) and potential FDRs (diamonds).

Acousto-optic (AO) cells have been used for correlation processing for many years. FIG. 6 shows a comparison in bandwidth and delay aperture between AO cell technology and potential FDR technology. The Xs and Os represent commercially available AO cells. The diamonds represent FDR potential. The left two diamonds represent capabilities that can be obtained with our current components. The upper right two diamonds represent potential capabilities that appear feasible. It is seen that the much higher bandwidth capability exists for the FDR devices, even at microsecond time delays, then from AO cells. Also the FDR does not require the bulk optical illumination hardware, such as lenses, that is required for AO cells.

Technology Development

There are a number of aspects of the TOP system that require further analysis and development.

One primary issue is the quality of the tap array. Ideally, we would like to generate a high optical quality tap array with prescribed positions, efficiencies and phases. The technique we have developed for generating the taps allows tap efficiency to be monitored while a tap is being created and to stop the tap generation at the correct level. However, the current FDR devices have been made with standard fibers that do not maintain the polarization state. In these fibers, the polarization state of the light varies as it propagates along the fiber. The taps produce linear polarization light, but its intensity will vary depending on the local state of polarization. This polarization state depends on the frequency of the light and temperature of the fiber. Using polarization maintaining (PM) fibers that will allow the generation of taps that will maintain their output intensities. Using the PM fiber leads to a better overall FDR efficiency since we are tapping a single polarization state and not losing energy to the orthogonal state.

Obtaining taps with phase fidelity to a fraction of the optical wavelength is difficult. Further, maintaining the tap phases of the array will be required. The TOP center frequency can drift with temperature changes. Construction techniques can be used that compensate for temperature effects, as well as controlling the temperature of the TOP. However, two-phase compensation techniques are available for obtaining phase fidelity without having geometric fidelity. One technique is to use digital holographic recording techniques and apply a digital matched filter in the post processing to correct for the original fabrication errors as well as drifting. This holographic technique has been demonstrated. The other technique uses a spatial light modulator (SLM) under electronic feedback control to continually correct the output phase of each individual tap. The SLM can compensate for the original fabrication errors as well as drifting. Further, it can apply real-time adaptive techniques on the array to compensate for dynamic effects such as could be generated by atmospheric effects. The holographic technique would require additional post-optical digital processing. The SLM technique would cause more light inefficiencies and introduce additional analog hardware complexities.

The application of a lenslet array to the tap array would improve overall light efficiency by one or two orders of magnitude. It also could improve the compactness of the correlator system.

Using the TOP at the front end of a receiver where the dynamic range requirements are small helps avoid pressing on the typical limited dynamic range of an optical analog processing system.

Conclusions

The TOP (Tapped Optical-Fiber Processor) clearly has unique potential to improve throughput rates and/or packaging when compared to an all-digital package. Extensive continuing investment by the optical telecommunication industry into fibers, fiber based devices and techniques, generates an improving technological base for successful development of this new type of fiber-based correlator.

I claim:

1. A method of signal processing, comprising the steps of:

providing an optical carrier signal;

modulating the optical carrier signal with an input signal to provide an optically modulated signal;

radiating the optically modulated signal from a set of taps formed in an optical fiber;

performing a spatial Fourier transformation on the radiated signal;

detecting the Fourier transformed signal and converting the detected signal into an electrical signal; and performing a digital Fourier transformation and other processing, such as calibration, on the electrical signal to output an autocorrelation of the input signal.

2. The method of claim 1, wherein the radiated signal is a function of the distance between the taps, the velocity of the signal through the fiber, and an aperture weighting function.

3. The method of claim 2, wherein the autocorrelation of the input signal is weighted by the autocorrelation of the aperture weighting function.

4. The method of claim 1, wherein the input signal is composed of the sum of two or more signals.

5. The method of claim 4, wherein the output includes the autocorrelation of the input.

6. The method of claim 4, further including the step of generating a cross-correlation between the component signals.

7. The method of claim 4, wherein the two signals are direct ladar or lidar optical signals.

8. The method of claim 4, wherein the two signals are radar signals.

9. The method of claim 7, wherein the radar signals are synthetic aperture radar signals.

10. The method of claim 4, further including the step of optically combining the two input signals.

11. A signal processor, comprising:

a coherent laser source operating at a carrier frequency;

a modulator to insert an input RF signal into the carrier;

an optical fiber radiator composed of a fiber with taps that radiate the modulated optical signal;

a lens to perform a spatial Fourier transformation on the radiated signal; and a detector array to output the transformed signal to a digital processor for additional signal processing.

12. The signal processor of claim 11, wherein the digital processor performs an additional Fourier transformation to output an autocorrelation of the input signal.

13. The signal processor of claim 11, wherein the radiated signal is a function of the distance between the taps, the velocity of the signal through the fiber, and an aperture weighting function.

14. The signal processor of claim 12, wherein the autocorrelation of the input signal is weighted by the autocorrelation of the aperture weighting function.

15. The signal processor of claim 11, wherein the input signal is composed of the sum of input two or more signals.

16. The signal processor of claim 15, wherein the output includes the autocorrelations of component inputs.

17. The signal processor of claim 15, wherein the digital processor is operative to generate a cross-correlation of the component signals.

18. The signal processor of claim 15, further including a radar received input signal and radar transmitted signal to generate the two input signals.

19. The signal processor of claim 18, wherein the radar signals are synthetic aperture radar signals.

20. The signal processor of claim 18, further including the step of optically combining the two input signals.

* * * * *